United States Patent
Geiger et al.

(10) Patent No.: US 10,451,123 B2
(45) Date of Patent: Oct. 22, 2019

(54) METHOD FOR REVERSING A DIRECTION OF TRAVEL OF A WORKING MACHINE COMPRISING A POWER SPLIT TRANSMISSION

(71) Applicant: ZF Friedrichshafen AG, Friedrichshafen (DE)

(72) Inventors: Simon Geiger, Oberteuringen (DE); Matthias Madlener, Hohentengen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 317 days.

(21) Appl. No.: 15/396,891

(22) Filed: Jan. 3, 2017

(65) Prior Publication Data

US 2017/0198765 A1 Jul. 13, 2017

(30) Foreign Application Priority Data

Jan. 8, 2016 (DE) .................. 10 2016 200 174

(51) Int. Cl.
*B60W 30/18* (2012.01)
*F16D 48/06* (2006.01)

(52) U.S. Cl.
CPC .......... *F16D 48/06* (2013.01); *B60W 30/18* (2013.01); *B60W 30/18036* (2013.01); *B60W 30/18045* (2013.01); *F16D 2500/10412* (2013.01); *F16D 2500/30806* (2013.01); *F16D 2500/3102* (2013.01); *F16D 2500/3124* (2013.01); *F16D 2500/50287* (2013.01)

(58) Field of Classification Search
None
See application file for complete search history.

(56) References Cited

U.S. PATENT DOCUMENTS

| 6,413,189 | B1 | 7/2002 | Spiess et al. | |
| 2015/0120114 | A1* | 4/2015 | Gotz | B60W 10/02 701/22 |
| 2015/0307101 | A1* | 10/2015 | Ries | F16H 61/16 192/219 |
| 2019/0032732 | A1* | 1/2019 | Daavettila | F16D 48/06 |

FOREIGN PATENT DOCUMENTS

| EP | 1 097 318 B1 | 12/2001 |
| WO | 2012148320 A1 | 11/2012 |

OTHER PUBLICATIONS

German Search Report issued in corresponding German Patent Application No. 10 2016 200 174.4 dated Jun. 30, 2017.

* cited by examiner

*Primary Examiner* — Justin Holmes

(57) ABSTRACT

A reversing method for reversing a travel direction of a working machine with a power-split transmission in which control signals are emitted by a control unit such that a reversing clutch, for the current travel direction, is disengaged and a reversing clutch for the new travel direction is engaged. The reversing clutches are controlled by control variables. If there is a difference between a reference control magnitude and a target control variable, the control variable is adapted. An adapted control signal is emitted, with which the reversing clutches are actuated, and for determining the target control variables for the disengaging and engaging of the reversing clutches, in addition to a translational factor and a rotational factor a load-dependent factor is determined and processed.

11 Claims, 2 Drawing Sheets

METHOD FOR REVERSING A DIRECTION OF TRAVEL OF A WORKING MACHINE COMPRISING A POWER SPLIT TRANSMISSION

This application claims priority from German patent application serial no. 10 2016 200 174.4 filed Jan. 8, 2016.

FIELD OF THE INVENTION

The present invention concerns a method for reversing a travel direction of a working machine that has a power-split transmission, and a reversing control device for carrying out the method according to the invention.

BACKGROUND OF THE INVENTION

Working machines are in particular machines which, in accordance with their design and the particular equipment permanently fixed on the vehicle, are intended and suitable for carrying out work but not for transporting people or goods. For example, they include agricultural or forestry machines, or also building machines. In particular but not exclusively, in the context of building machines wheel loaders, mobile baggers or also tipper vehicles (for example so-termed dump-trucks) can be mentioned.

In working machines power-split transmissions, in particular mechanical/hydrostatic power-split transmissions are often used. When a travel direction reversal is required, a reversing clutch for the current travel direction is opened and a reversing clutch for the new travel direction is closed. Here it is also known that control variables are used for the opening and closing of the reversing clutches, and for determining the control variables a rotational factor and a translational factor are taken into account. In this context the rotational factor relates to the proportion required for the rotation of the internal rotating masses in the transmission. In a general sense the rotational factor represents the fraction of the moment of inertia of the transmission in the reversing process. The translational factor, in contrast, includes above all else the theoretical vehicle mass and the preselected or required reversing dynamic.

From EP 1 097 318 B1 by the present applicant it is known to initiate a travel direction reversal automatically even at high speeds, by first reducing the travel speed to a lower value by increasing the transmission ratio of a transmission with continuously variable ratio. Then, an open clutch for the new travel direction and a closed clutch for the previous travel direction are each brought to slipping operation, whereby the drive torque is transferred without interruption and without any jerking from the previously closed clutch to the previously open clutch. The previously closed clutch is steadily opened further until it is operating without slip. The previously open clutch remains in slipping operation until the vehicle is first braked and then accelerates in the new travel direction, until the driven side and the drive output side of the previously open clutch have reached synchronous speed. Further, the document discloses ways in which the driver can intervene, by actuating the clutch, brake or accelerator pedal, whereby the reversing process can be slowed down or accelerated.

A disadvantage of the known solutions is that in working machines with an automated reversing process, the control variables are pre-set with reference to fixed parameters. Thus, the reversing process of the working machine is carried out under constant conditions. This has the negative consequence that, on the one hand, for the driver the behavior of the vehicle is not always easy to understand and sometimes not reliably reproducible, and on the other hand, non-optimal reversing processes result in poorer quality of the reversing process and ultimately, therefore, to lower productivity/efficiency of the working machine. Furthermore the wear, especially that of the reversing clutches is substantially increased. According to the aforesaid EP 1 097 318 B1 by the present applicant, it is known that the reversing process can be influenced by actuating the clutch, brake or accelerator pedal, which amounts to an intervention based upon the driver's subjective estimation which does not necessarily result in power- and wear-optimized operation of the working machine.

SUMMARY OF THE INVENTION

Thus, the purpose of the present invention is to provide a better method for carrying out an automated reversing process. This objective is achieved by a method and a reversing control device as described below.

The reversing of a working machine is understood to mean that from driving operation in a first travel direction a change is carried out to driving operation in a second travel direction. During this the reversing process itself comprises a step in which the working machine is braked (from its driving operation in the first travel direction), a step in which the transmission is shifted or a reversing transmission/one or more reversing clutches are actuated to reverse the direction in which a drive element is rotating, and a step in which the working machine is accelerated (for driving operation in the second travel direction).

Reversing takes place particularly frequently during so-termed Y-operation, which is characteristic for working machines during loading and unloading processes. After a transport load (bulk or loose material) has been taken up, the vehicle drives in a first direction (for example, in reverse) to get clear of the loading point (maneuvering). The working machine is then braked and the transmission is shifted to change the rotational direction of the drive. Thereafter, the vehicle accelerates in the second driving direction and travels to the unloading point.

The reversing dynamic describes how the steps of the reversing process are carried out, and in particular the time frames for braking, shifting and accelerating again. For example, the braking of the working machine takes place by taking account of the thrust torque of the drive element as the transmission ratio of the transmission changes. In this way the vehicle can be slowed largely without wear.

For the determination of the load-dependent factor, for example the actual hydraulic pressure present in a hydrostatic power branch of a transmission with hydrostatic power-splitting, is measured and used for determining the load-dependent factor. Thus, this serves as an indicator for the load carried or the thrust torque applied, which is supported by the transmission. Depending on the travel direction, this high pressure is calculated by way of the transmission ratio steps and a torque on the reversing clutch concerned.

By taking account of the thrust torque provided by the transmission and the reversing dynamic called for, it can be identified whether a particular thrust torque has been produced by the reversing dynamic called for, or whether it is the result of external influences, such as driving downhill.

The result of this is that, for example, when in a first travel direction the vehicle is driving up an incline and a direction change from a first travel direction to a second travel direction is carried out, the reversing clutch for the second travel direction is acted upon by less torque, since in that case the force due to the downward incline supports the direction change and the desired reversing dynamic can be achieved with a lower transmitted torque. Without adapting the control of the reversing clutch, in some circumstances the result would be that the clutch was synchronized too rapidly and the reversing process would end abruptly. That would on the one hand be perceived by the driver as an unpleasant jerk, and on the other hand it would increase the loads on the structure, in particular on the components of the power-train.

In contrast, if a reversing process is carried out on downward-inclined ground, i.e. when the vehicle is moving downhill and then reverses from the first travel direction to the second travel direction, more torque has to be applied to the clutch being closed in order to carry out the reversing process with the desired reversing dynamic. In the case described the force due to the incline opposes the reversing process and without adapting the control of the reversing clutch being closed, that clutch would in some circumstances be actuated in slipping operation for too long a time, which can result in increased wear or even a malfunction.

Instead of an upward or downward incline, the above-described procedure can also be used to evaluate a load condition of the working machine. A larger load results in increased vehicle weight, which when reversing has an effect similar to that when driving downhill, whereas in contrast reversing with no load acts similarly to driving uphill because of the lower vehicle weight.

As a further variant it is conceivable to use the load-dependent factor exclusively for the control of the reversing clutches. Correspondingly, there would be no need for an adjustment relating to reference control parameters.

Instead of the measured hydraulic pressure in the hydrostatic power branch of the hydrostatic power-split transmission, any other load-dependent signal such as the motor torque (obtained from the motor control unit) can be used. Furthermore, a choice can be made of what is to serve as the desired dynamic. This can for one thing be a required drive output rotational speed gradient (rpm/s), or a nominal drive output rotational speed gradient (rpm/s) corrected for the Diesel load limit, or the gradient of the transmission ratio of the transmission actually set.

In a further optimization step, in collaboration with a vehicle computer or motor control unit it could be taken into account whether the load condition of the transmission is changing due to external influences or because vehicle components have to be switched on or off, such as a motor brake, service brake, retarder, work hydraulic system, hybridization devices, a fan, or closing the opposite reversing clutch, and correspondingly taken into account in the determination of the load-dependent factor.

The result of actuating the motor brake is that a higher thrust torque can be supported by the motor. An actuated service brake leads to a lower thrust torque supported by the transmission. On the other hand, the actuation of a retarder, hybridization devices on the primary side or a fan, have the effect that more thrust torque can be supported by the transmission.

Actuation of hybridization devices on the secondary side leads to a reduction of the torque that can be supported by the transmission.

BRIEF DESCRIPTION OF THE DRAWINGS

The object of the present invention will now be described in more detail with reference to the attached figures, which show.

DETAILED DESCRIPTION OF THE PREFERRED EMBODIMENTS

Figure 1:
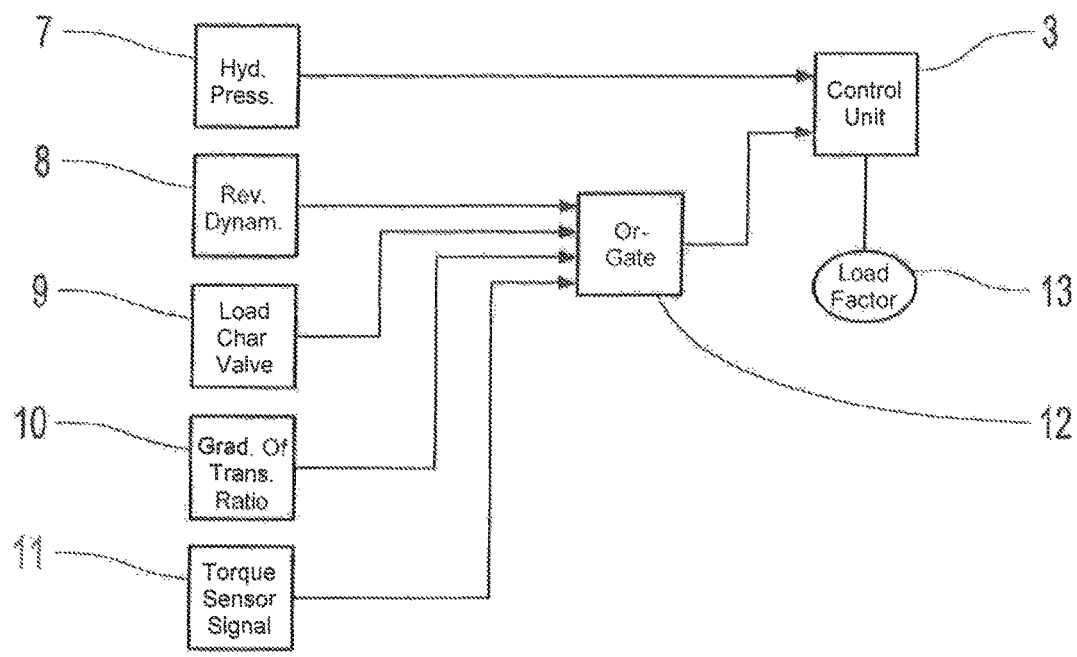
FIG. 1: A schematic representation of a possible sequence for determining the load-dependent factor.

FIG. 1 shows a schematic representation of a possible sequence for the determination of the load-dependent factor 13. In this case, by way of a logical Or-gate 12 the various load-dependent signals, for example the required reversing dynamics 8, the Diesel load limit characteristic 9, the gradient of the transmission ratio 10 of the transmission or a signal from a torque sensor 11, are selected. Since the logical Or-gate is not an exclusive one, one or more load-dependent signals may be involved in the determination of the load-dependent factor 13. Furthermore, the value of the hydraulic pressure 7 in the hydrostatic power branch is taken into account in the determination. With reference to these characteristic values, the load-dependent factor 13 is recalculated/determined for example in a control unit 3.

Figure 2:
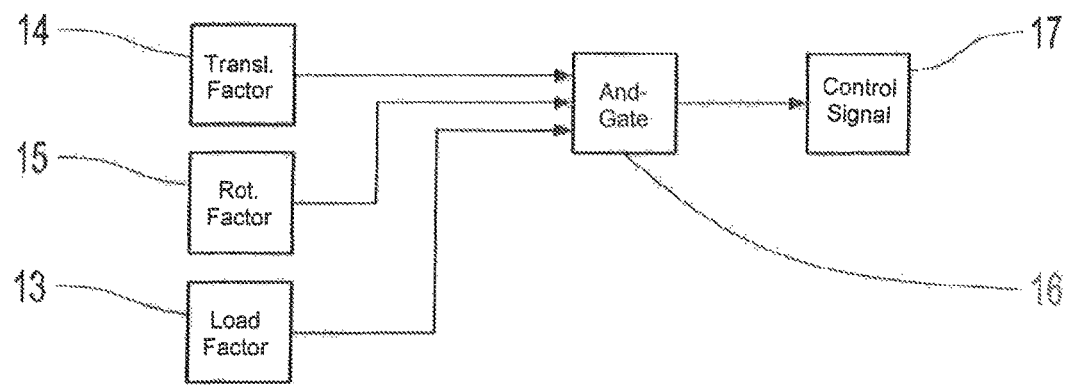
FIG. 2: Schematic representation of the determination of the target control variable.

FIG. 2 shows a schematic representation of the determination of the target control variable for controlling the reversing clutch 4. The determination of the target control variable takes account of the translational factor 14, the rotational factor 15 and the load-dependent factor 13.

Figure 3:
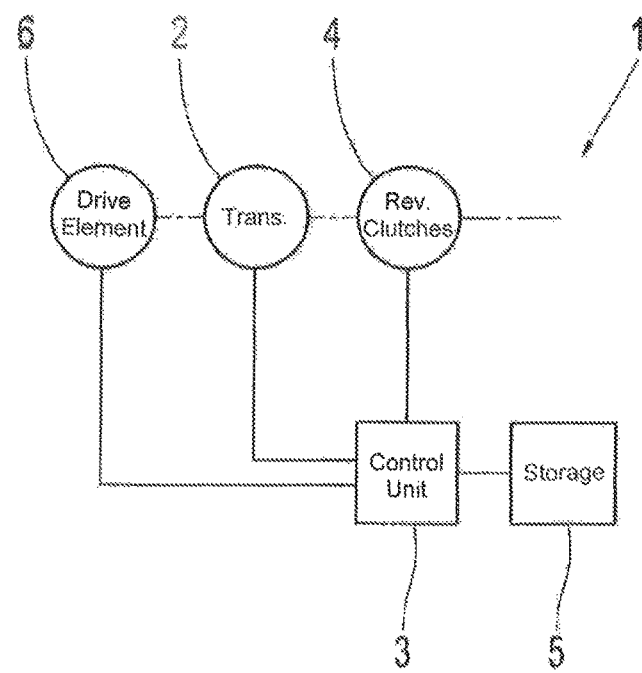
FIG. 3: Schematic representation of an arrangement of a reversing control device.

FIG. 3 shows a schematic representation of an arrangement of a reversing control unit 1. In this, a drive element (for example a Diesel engine), a transmission 2 (for example a hydrostatic power-split transmission) and a reversing transmission with one or more reversing clutches 4 (which can also be made in the form of a dual shifting element) are connected with one another in a power-transmitting manner. The transmission of power is represented by broken lines.

Moreover, the drive element 6, the transmission 2 and the reversing transmission are connected to a control unit 3 for the transmission of signals. The control unit 3 is also connected to a storage element 5 for the transmission of signals. In alternative embodiments the storage element 5 can also be integrated in the control unit 3. The load-dependent signals are read out and processed by the control unit 3. A control magnitude for the actuation of the reversing clutches 4 is determined, and here a comparison is made between target control variables and reference control magnitudes. As a function of the load-dependent factor 13, an adapted control signal for the control of the reversing clutches 4 is emitted.

INDEXES

1 Reversing control device
2 Transmission
3 Control unit
4 Reversing clutches
5 Storage element
6 Drive element
7 Hydraulic pressure (in the hydrostatic power branch)
8 (Required) reversing dynamics
9 Characteristic value
10 Gradient of the transmission ratio of the transmission
11 (Signal) torque sensor
12 Or-gate
13 Loa-dependent factor
14 Translational factor 15 Rotational factor
16 And-gate
17 (Adapted) control signal

The invention claimed is:

1. A reversing method for reversing a travel direction of a working machine with a power-split transmission, the method comprising:
   emitting control signals by a control unit whereby a reversing clutch for a current travel direction is disengaged and a reversing clutch for a new travel direction is engaged;
   determining and taking into account a theoretical mass of the working machine and a fraction of a moment of inertia of the transmission during a reversing process, and an actual hydraulic pressure present in the transmission for determining at least one target control variable for the disengaging and engaging of the reversing clutches; and
   controlling the reversing clutches by control variables such that if there is a difference between a reference control magnitude and the at least one target control variable, emitting an adapted control signal by which the reversing clutches are actuated.

2. The method according to claim 1, further comprising determining a load-dependent factor during braking of the working machine.

3. The method according to claim 1, further comprising determining the load-dependent factor as a function of a thrust torque produced by the transmission and a required reversing dynamic.

4. The method according to claim 1, further comprising using a hydrostatic power-split transmission as the transmission and determining the thrust torque produced by the transmission by a hydraulic pressure in a hydrostatic power branch of the transmission in combination with a current transmission ratio of the transmission.

5. The method according to claim 1, further comprising determining the load-dependent factor with reference to either a torque sensor, on the transmission output, or with reference to another load-dependent signal.

6. The method according to claim 1, further comprising if the reversing process is required, when driving downhill, the adapted control signal received for the engaging of the reversing clutch for the new travel direction has an effect that an increased torque is required at the reversing clutch being engaged.

7. The method according to claim 1, further comprising if the reversing process is required, when driving uphill, the adapted control signal received for the engaging of the reversing clutch for the new travel direction has an effect that a reduced torque is required at the reversing clutch being engaged.

8. A reversing control device comprising:
   a control unit and a storage element,
   the reversing control device being designed to carry out a method of reversing a travel direction of a working machine with a power-split transmission emitting control signals by a control unit whereby a reversing clutch for a current travel direction is disengaged and a reversing clutch for a new travel direction is engaged, and the reversing clutches are controlled by control variables such that if there is a difference between a reference control magnitude and a target control variable, emitting an adapted control signal by which the reversing clutches are actuated, and determining target control variables for disengaging and engaging of the reversing clutches, and determining and taking into account a theoretical mass of the working machine, a fraction of a moment of inertia of the transmission during a reversing process, and an actual hydraulic pressure present in the transmission in such manner that, during a first step, emitted parameters are read in and compared with stored reference values, in order, during a second step, to determine the actual hydraulic pressure by which, during a third step, taking account of further parameters, the control signal for actuating the reversing clutches required for the reversing process is emitted.

9. The reversing control device according to claim 8 in combination with the working machine.

10. The use of method according to claim 1 in a working machine.

11. A reversing method for reversing a travel direction of a working machine with a power-split transmission, the method comprising:
   emitting control signals from a control unit to open a first reversing clutch, which is engaged for travel in a current travel direction and to engage a second reversing clutch for travel in a new travel direction;
   determining and taking into account a theoretical mass of the working machine, a fraction of a moment of inertia of the transmission during a reversing process and an actual hydraulic pressure present in the transmission for determining the target control variables for the disengaging of the first reversing clutch and the engaging of the second reversing clutch; and
   controlling the first and the second reversing clutches with control variables such that if there is a difference between a reference control magnitude and a target control variable, emitting an adapted control signal with which the first and the second reversing clutches are actuated.

* * * * *